(12) United States Patent
Choi et al.

(10) Patent No.: US 7,353,029 B2
(45) Date of Patent: Apr. 1, 2008

(54) HANDOVER METHOD FOR NEXT GENERATION MOBILE COMMUNICATION SYSTEM HAVING OVERLAPPING AREA

(75) Inventors: Young-June Choi, Seoul (KR); Mi-Sun Do, Suwon-si (KR); Seung-Young Park, Seoul (KR); Sung-Hyun Cho, Seoul (KR); Sae-Woong Bahk, Seoul (KR); Neung-Hyung Lee, Seoul (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 0 days.

(21) Appl. No.: 11/177,037

(22) Filed: Jul. 8, 2005

(65) Prior Publication Data
US 2006/0046722 A1 Mar. 2, 2006

(30) Foreign Application Priority Data
Aug. 27, 2004 (KR) ...................... 10-2004-0068152

(51) Int. Cl.
*H04Q 7/20* (2006.01)
(52) U.S. Cl. .................. 455/437; 455/438; 455/439; 370/331; 370/338
(58) Field of Classification Search ................ 455/438, 455/437, 439, 436; 370/331, 338
See application file for complete search history.

(56) References Cited

U.S. PATENT DOCUMENTS

| | | | |
|---|---|---|---|
| 7,092,709 B1* | 8/2006 | Honkala et al. ......... | 455/432.1 |
| 2002/0131386 A1* | 9/2002 | Gwon ....................... | 370/338 |
| 2002/0141360 A1 | 10/2002 | Baba et al. | |
| 2002/0168980 A1 | 11/2002 | Gwon et al. | |
| 2003/0104814 A1 | 6/2003 | Gwon et al. | |
| 2003/0125027 A1 | 7/2003 | Gwon et al. | |
| 2003/0223422 A1* | 12/2003 | Igarashi et al. ............. | 370/390 |
| 2004/0005894 A1* | 1/2004 | Trossen et al. ............. | 455/436 |
| 2004/0085957 A1* | 5/2004 | Verma ........................ | 370/389 |

(Continued)

FOREIGN PATENT DOCUMENTS

WO WO 96/02117 1/1996

*Primary Examiner*—Danh Le
(74) *Attorney, Agent, or Firm*—The Farrell Law Firm, PC (57) ABSTRACT

Disclosed is a handover method for an IP-based next generation mobile communication system. With a handover method including 1) determining whether or not a predetermined mobile terminal goes into the overlapping area; 2) starting a Layer 3 (L3) handover operation between the neighboring access routers as the mobile terminal goes into the overlapping area; 3) if the Layer 3 handover operation between the neighboring access routers is completed, establishing a data path for the mobile terminal to pass through an access router after the Layer 3 handover; 4) if the mobile terminal leaves a cell area including the mobile terminal in steps 2) and 3), performing by the mobile terminal Layer 2 handover between cells and receiving by the mobile terminal data through a cell base station after the Layer 2 handover and an access router before the Layer 3 handover; and 5) if the mobile terminal leaves a cell area including the mobile terminal after step 3), performing by the mobile terminal Layer 2 handover between cells and receiving by the mobile terminal data through a cell base station after the Layer 2 handover and an access router after the Layer 3 handover.

24 Claims, 5 Drawing Sheets

U.S. PATENT DOCUMENTS

2004/0196808 A1* 10/2004 Chaskar et al. ............. 370/331
2004/0266400 A1* 12/2004 Boland et al. ........... 455/412.1
2005/0048972 A1* 3/2005 Dorenbosch et al. ....... 455/436
2006/0153149 A1* 7/2006 Uno et al. .................. 370/338

* cited by examiner

HANDOVER METHOD FOR NEXT GENERATION MOBILE COMMUNICATION SYSTEM HAVING OVERLAPPING AREA

PRIORITY

This application claims priority to an application entitled "Handover Method for Next Generation Mobile Communication System Having Overlapping Area" filed in the Korean Intellectual Property Office on Aug. 27, 2004 and assigned Ser. No. 2004-68152, the contents of which are incorporated herein by reference.

BACKGROUND OF THE INVENTION

1. Field of the Invention

The present invention relates to a handover method for an IP-based next generation mobile communication system network.

2. Description of the Related Art

Next generation mobile communication system networks currently in development employ an integrated wireless telephone and Internet Protocol (IP) network. It is expected that the next-generation system will seamlessly integrate the wireless telephone network with the IP network.

Accordingly, in the next generation mobile communication system networks, Layer 3 handover (handover for routing in the IP network) is important for proper operation, as is Layer 2 handover (handover between base stations in the wireless telephone network), both of which have attracted attention in conventional wireless telephone networks.

Figure 1:
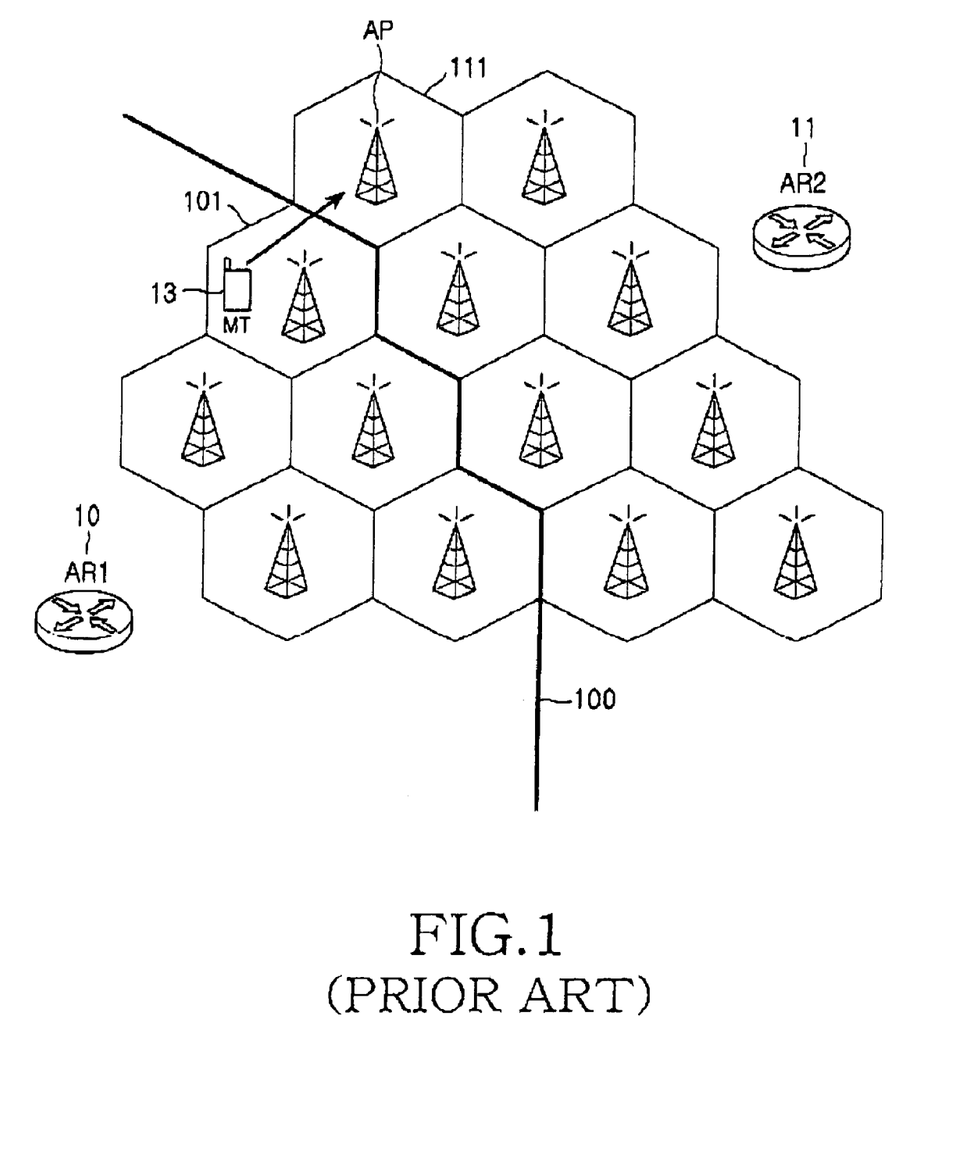
FIG. 1 is a view for explaining a cell group for handover in a conventional next generation mobile communication system.

FIG. 1 is a view for explaining a cell group for handover in the conventional next generation mobile communication system.

The conventional next generation mobile communication system includes an access router 1 (AR 1) 10 and an access router 2 (AR2) 11 for routing in an IP network. The ARs 10 and 11 include a plurality of access points (APs), each of which controls one cell. Each AP provides services for a mobile terminal (MT) 13 located in a cell controlled by the AP.

In the conventional next generation mobile communication system, AR areas are divided in the same manner as AP groups are divided as shown by line 100 in FIG. 1. Accordingly, L2 handover between APs and L3 handover between ARs are performed at the same time.

As described above, each of the ARs relates to an individual network constructed by binding a plurality of cells into a cell group. Herein, only L2 handover is performed when the MT moves in each cell group, and the L2 handover of the APs and the L3 handover between the ARs are performed at the same time when the MT moves between cell groups.

Figure 2:
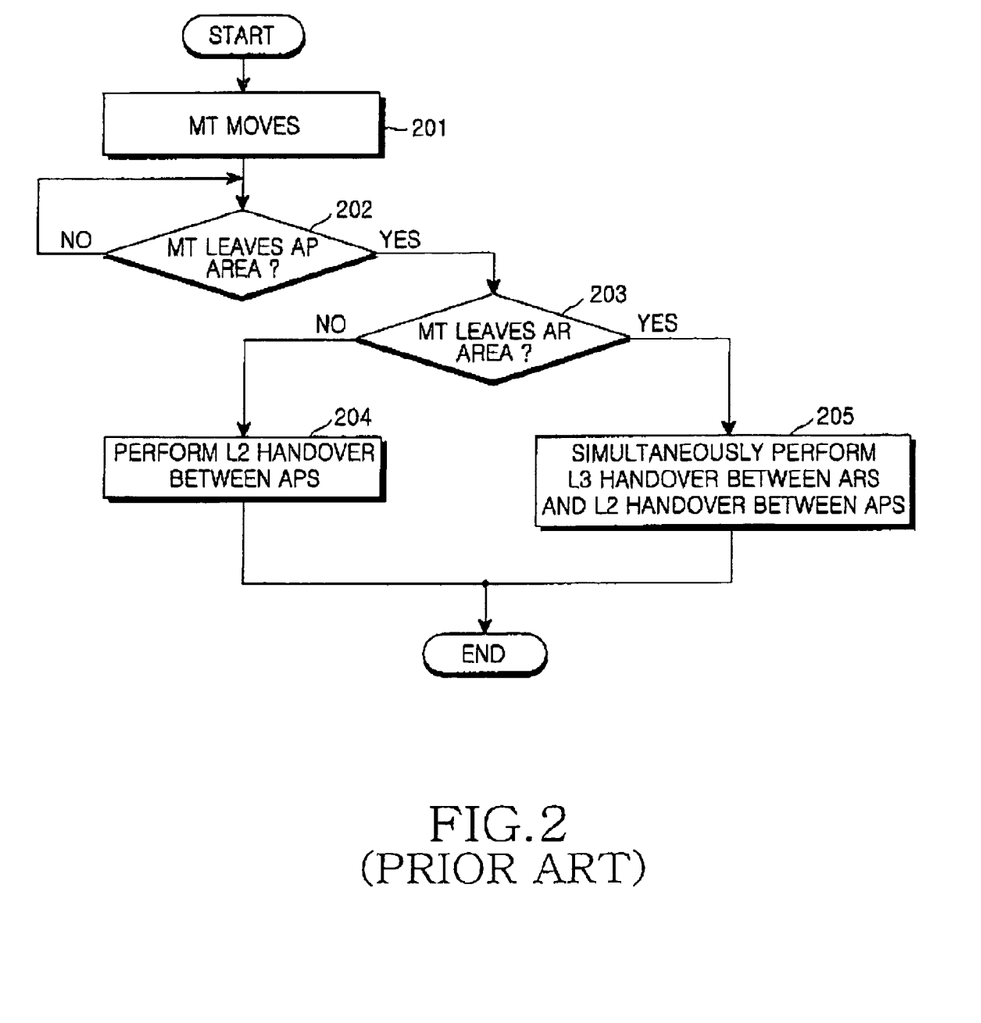
FIG. 2 is a flowchart showing a handover process in a conventional next generation mobile communication system.

FIG. 2 is a flowchart showing the handover process in the conventional next generation mobile communication system.

If the MT 13 moves (step 201), it is determined whether or not the mobile terminal 13 has left a predetermined AP area (step 202). Referring to FIG. 1, it is determined whether or not the MT 13 of an AP 101 has moved to another AP.

Thereafter, if the MT 13 has left the predetermined AP area, it is determined whether or not the MT 13 has left an AR area (step 203). Referring to FIG. 1, it is determined whether or not the MT 13 of the AP 101 has moved to an AP 111 in another AR area.

If it is determined that the MT 13 has left the AR area in step 203 (i.e., if the MT 13 moves to the AP 111 shown in FIG. 1), the MT 13 performs L3 handover between ARs and L2 handover between APs at the same time (step 205).

If, however, it is determined that the MT 13 has not left the AR area in step 203 (i.e., if the MT 13 moves to another AP in the same AR area and not the AP 111 shown in FIG. 1), the L2 handover between APs is performed (step 204).

When the above mobile IP technique is employed and the L2 handover and the L3 handover are performed at the same time, data is not transmitted until the L3 and L2 handover is complete since the L3 handover has signaling delay time longer than that of the L2 handover.

Additionally, in the next generation mobile communication network, since each cell radius becomes smaller than a present cell radius according to increase of band frequency, handover occurs more frequently. In particular, if the L2 handover and the L3 handover are done repeatedly in overlapping areas where movement between areas frequently occurs, it is impossible to efficiently transmit data.

In addition, since each handover is achieved through signaling messages over a radio link, such simultaneous support for both the L2 and L3 handover creates excessive in the signaling messages, and wasting radio resources.

SUMMARY OF THE INVENTION

Accordingly, the present invention has been made to solve the above-mentioned problems occurring in the prior art, and an object of the present invention is to provide a handover method for a next generation mobile communication system having an overlapping area, that can reduce overheads of L3 handover and efficiently transmit data in an IP-based mobile communication network.

Another object of the present invention is to provide a handover method for a next generation mobile communication system having an overlapping area, that can reduce a packet drop rate and packet delay time caused by individually transmitting packets between two routers when L3 handover occurs.

To accomplish the above objects, there is provided a handover method for an Internet protocol (IP)-based next generation mobile communication system, the handover method including arranging at borders between access routers managing cell groups an overlapping area to which all of the neighboring access routers have access; and if a predetermined terminal enters the overlapping area, making Layer 3 handover (L3 handover) between the neighboring access routers performed with respect to the mobile terminal.

According to another aspect of the present invention, there is provided a handover method for an Internet protocol (IP)-based next generation mobile communication system arranging at borders between access routers managing cell groups an overlapping area to which all of the neighboring access routers have access, the handover method including determining whether or not a predetermined mobile terminal goes into the overlapping area; starting a Layer 3 (L3) handover operation between the neighboring access routers as the mobile terminal goes into the overlapping area; if the Layer 3 handover operation between the neighboring access routers is completed, establishing a data path for the mobile terminal to pass through an access router after the Layer 3 handover; if the mobile terminal leaves a cell area including the mobile terminal performing by the mobile terminal Layer 2 handover between cells and receiving by the mobile terminal data through a cell base station after the Layer 2 handover and an access router before the Layer 3 handover;

and if the mobile terminal leaves a cell area including the mobile terminal, performing by the mobile terminal Layer 2 handover between cells and receiving by the mobile terminal data through a cell base station after the Layer 2 handover and an access router after the Layer 3 handover.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

Figure 3:
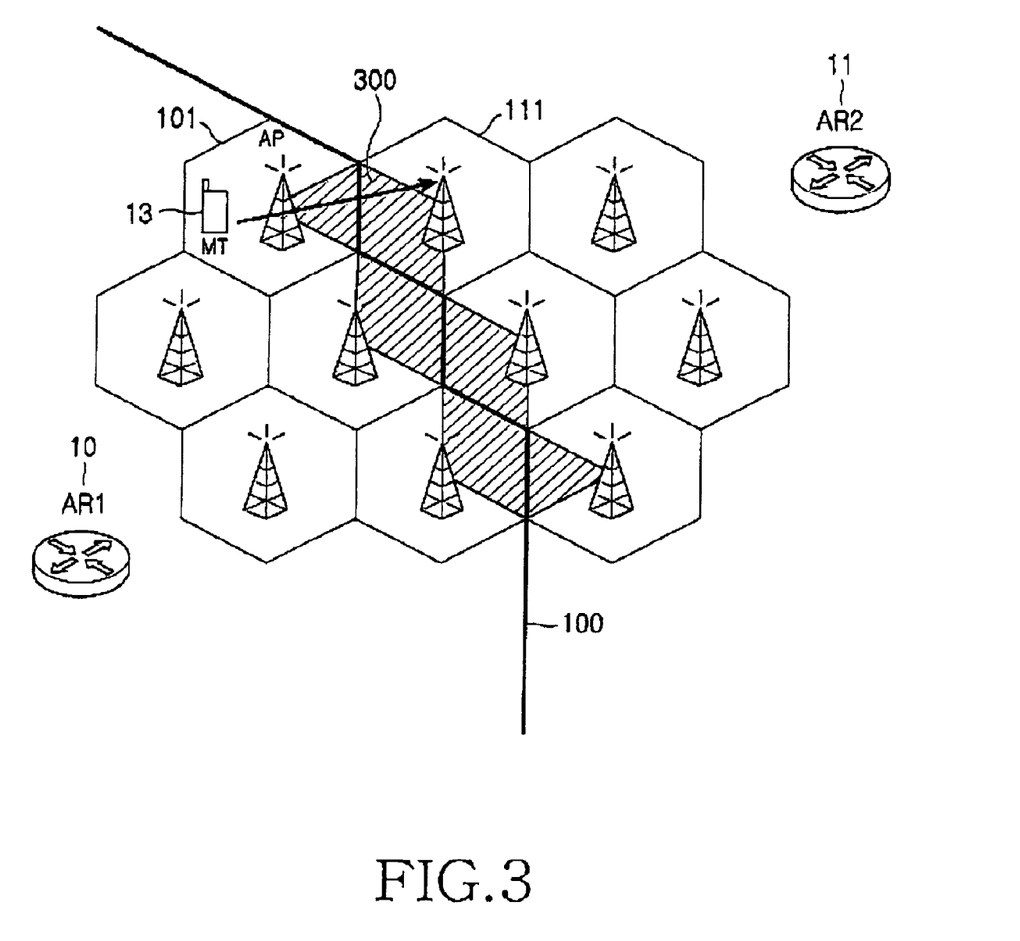
FIG. 3 is a view showing an overlapping cell group in a next generation mobile communication system according to an embodiment of the present invention.

FIG. 3 is a view for explaining an overlapping cell group in a next generation mobile communication system according to an embodiment of the present invention.

As shown in FIG. 3, the next generation mobile communication system includes an access router 1 (AR 1) 10 and an access router 2 (AR2) 11 for performing routing functions in the IP network. Each of the ARs 10 and 11 includes a plurality of access points (APs), each of which controls one cell. Each AP provides services for a mobile terminal (MT) 13 located in a cell controlled by the AP. In addition, as shown in FIG. 3, an overlapping area between cells of the AR1 10 and cells of the AR2 11 is arranged at both sides of line 100 of FIG. 3 which divides the area of the AR1 10 and the area of the AR 2 11.

As described above, according to an embodiment of the present invention, in sectors in the border of a cell group belonging to each AR, access to all ARs (e.g., the AR1 and the AR2) making the border is allowed. In certain cells, access to at least two ARs is allowed according to the number of overlapping cell groups. In addition, APs in the overlapping area have interfaces for at least two ARs. Therefore, it is unnecessary to consider additional IP routing for uplink transmission, because uplink transmission can be achieved through either of the ARs.

In the conventional structure shown in FIG. 1, since both L2 handover and L3 handover are required for movement between cell groups, time is considerably delayed.

According to an embodiment of the present invention, the L2 handover and the L3 handover are separated, such that the L3 handover may be performed in an overlapping area 300. In other words, the movement of the mobile terminal 13 is estimated to perform the L3 handover in the overlapping area 300. The L2 handover is independently performed from the L3 handover according to movement of the mobile terminal 13 between cells in the same manner as the conventional technique.

Figure 4:
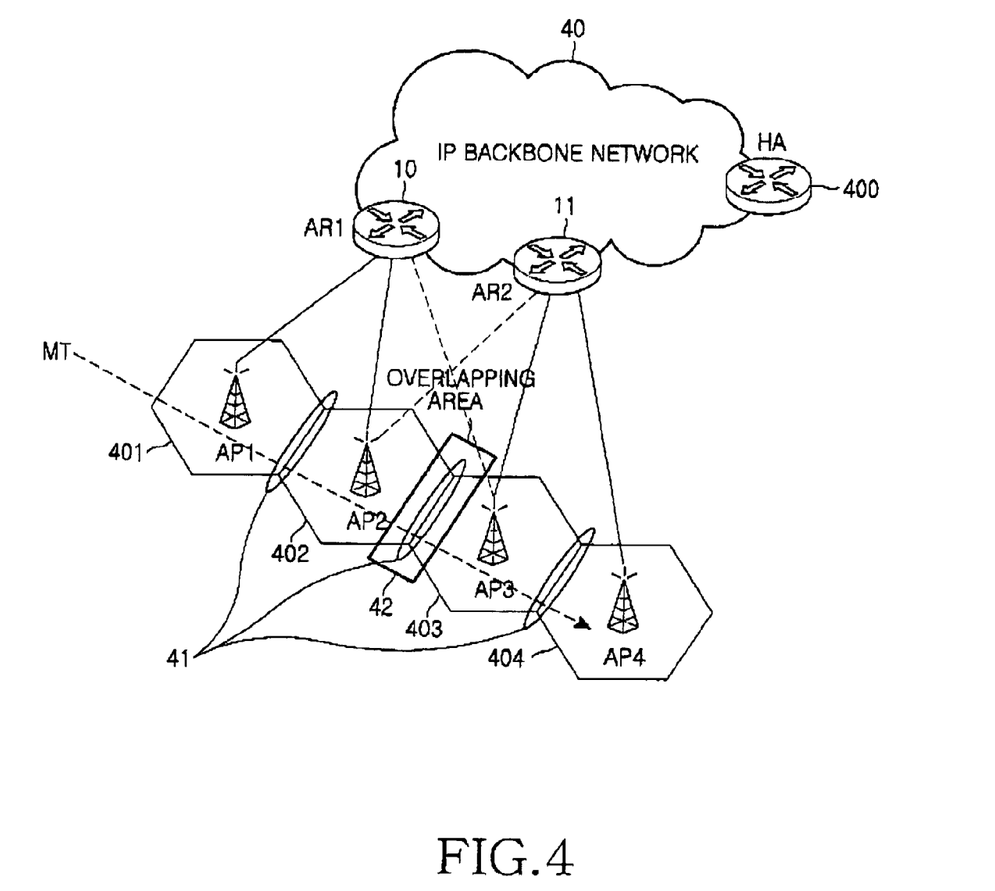
FIG. 4 is a view for explaining handover in a next generation mobile communication system having an overlapping area according to an embodiment of the present invention.

FIG. 4 is a view for explaining handover in the next generation mobile communication system having the overlapping area according to the present invention.

As shown in FIG. 4, the next generation mobile communication system includes a home agent (HA) 400 for storing information regarding a position and a specific identifier (ID) of the mobile terminal, an IP backbone network 40 for IP communication, the AR 1 10 and the AR 2 11 which are connected to the IP backbone network 40, an AP 1 401 and an AP 2 402 which control cells belonging to the AR 1 10, an AP 3 403 and an AP 4 404 which control cells belonging to the AR 2 11, and the mobile terminal 13 which is moving to the AP 4 404 from the AP 1 401 through the AP 2 402 and the AP 3 403.

In addition, an overlapping area 42 in which the L3 handover is performed with respect to the AR 1 10 and the AR 2 11 exists between the AP 2 402 and the AP 3 403. In this overlapping area 42, it is possible to have access to both the AR 1 10 and the AR 2 11.

Hereinafter, the handover operation where the mobile terminal 13 is moving to the AP 4 404 from the AP 1 401 through the AP 2 402 and the AP 3 403 as shown in FIG. 4, will be described.

When the mobile terminal 13 performs handover 41 to the AP 2 402 from the AP 1 401, since the mobile terminal 13 performs handover between APs belonging to the same AR, the mobile terminal 13 performs the L2 handover. In addition, if the mobile terminal 13 goes into the overlapping area 42 while moving to the AP 3 403 from the AP 2 402, the mobile terminal 13 performs the L3 handover.

At this time, the L2 handover 41 between the AP 2 402 and the AP 3 403 in the overlapping area 42 is performed separately from the L3 handover.

Since the overlapping area 42 is connected to the areas of both the AR 1 10 and the AR 2 11, the AP 2 402 having detected the movement for the mobile terminal 13 entering a corresponding sector of the AP 2 commands the L3 handover. In other words, the L3 handover occurs to the AR 2 11 from the AR 1 10 after the L2 handover to the AP 2 402 from the AP 1 401, and then, when the mobile terminal 13 enters the AP 3 403, the L2 handover occurs again. In this case, since one AP is connected to at least two ARs, it is possible to solve overhead problems caused by the L3 handover simultaneously occurring with the L2 handover.

In addition, in the conventional technique without overlap of cell groups, a scheme of forwarding packets to a new AP from a previous AP has to be considered because the mobile terminal has to receive packets (generated during handover and remaining in queues instead of being served) from mutually different ARs.

However, according to the present invention, it is possible to receive packets arriving at the AP 2 402 through the AR 1 10 without forwarding the packets to another router (e.g., AR2). Although a care-of-address (COA) of the packets changes in the IP layer, the packets can be mapped with a previous link layer ID. Therefore, the AP can transmit the previous packets as is to the mobile terminal by adding only a few functions.

Hereinafter, the handover process discussed above will be described in chronological sequence. Since the HA 400 is bound to one path, packets to be transmitted to the mobile terminal 13, are forwarded to the AR 1 10, before the L3 handover, and forwarded to the AR 2 11 after the L3 handover. Herein, it is enough to deliver all packets received during the L3 handover to the APs (AP2 or AP3). In addition, packets generated by the mobile terminal 13 performing handover can be routed to one of the AR 1 10 and the AR 2 11 because each AP has access to both the AR 1 10 and the AR 2 11 in the overlapping area (reference numeral 42).

Figure 5:
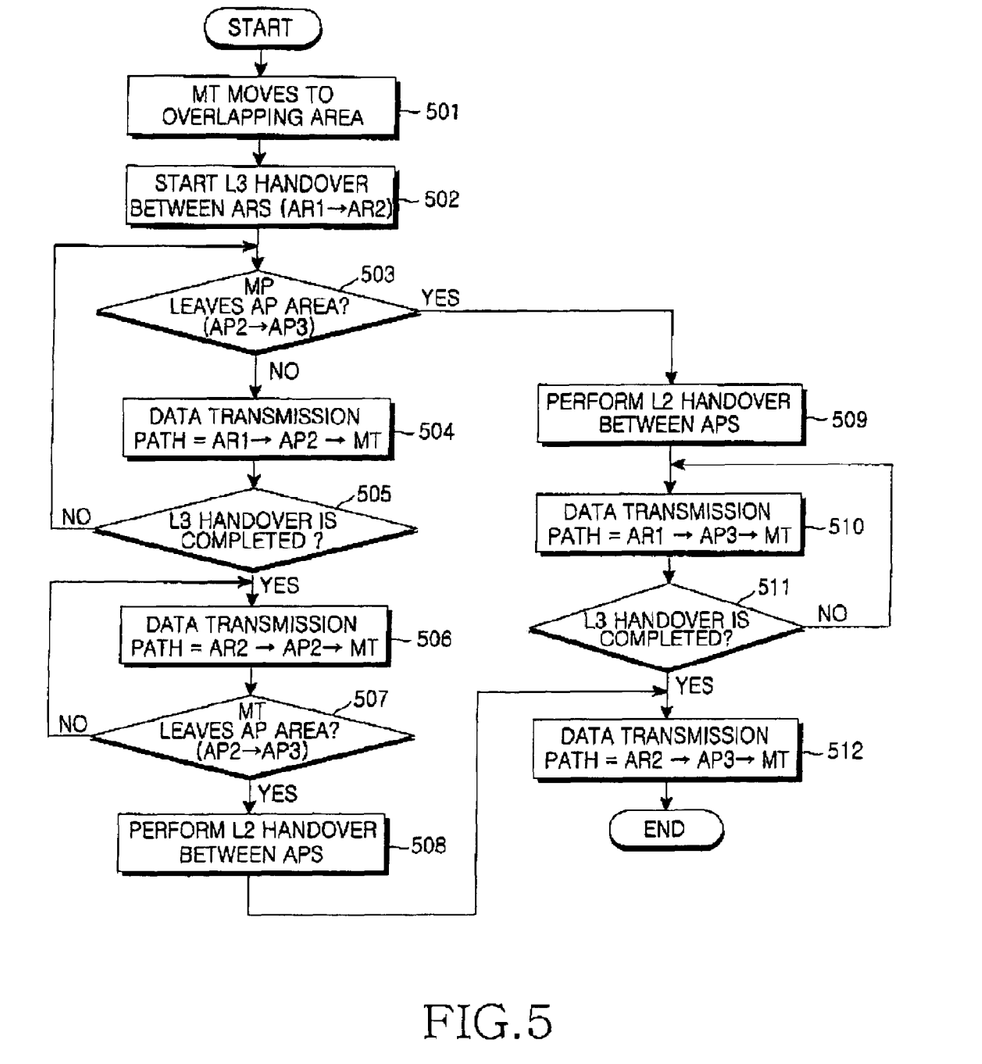
FIG. 5 is a flowchart showing a handover process in a next generation mobile communication system having an overlapping area according to an embodiment of the present invention.

FIG. 5 is a flowchart showing the handover process in the next generation mobile communication system having the overlapping area according to an embodiment of the present invention.

It is assumed that the mobile terminal belongs to the AR 1 and the AP 2 and is moving to the AR 2 and the AP 3. In this situation, data is delivered to the mobile terminal from the AR 1 through the AP 2.

If the mobile terminal moves to the overlapping area (step 501), an AP having detected the movement of the mobile terminal commands the L3 handover between ARs (AR 1→AR2) with respect to the corresponding mobile terminal, so that the L3 handover may start. Although this shows a case in which an AP detects the mobile terminal movement to allow the L3 handover, it may be set in such a manner that the mobile terminal detects the movement through a pilot signal, and then, the L3 handover is performed.

Then, it is determined whether or not the mobile terminal left the current AP (AP 2) area (step 503). If the mobile terminal has left the AP area, the L2 handover between APs (AP 2→AP 3) is performed independently from the L3 handover (step 509). Herein, data is transmitted to the mobile terminal from the AR 1 (because the L3 handover is not completed yet) through the AP2 (step 510).

If the mobile terminal has not left the AP area (AP2) in step 503, data is transmitted to the mobile terminal from the AR 1 (because the L3 handover is not completed yet) through the AP 2 (step 504).

If the L3 handover has been completed on the data transmission path in step 504, data is transmitted to the mobile terminal from the AR 2 through the AP 2 (step 506). Thereafter, it is determined whether the mobile terminal has left the current AP (AP 2) area (step 507). If the mobile terminal has left the AP area, the L2 handover between APs (AP 2→AP 3) is performed independently from the L3 handover (step 508). At this point, data is transmitted to the mobile terminal from the AR 2 through the AP 3 (step 512). If the mobile terminal has not left the AP area in step 507, the data transmission path (on which data is transmitted to the mobile terminal from the AR 2 through the AP 2) is maintained (step 506) until the mobile terminal leaves the AP area (step 507).

If the L3 handover has been completed on the data transmission path in step 510 (step 511), data is transmitted to the mobile terminal from the AR 2 through the AP 3 (step 512). If the L3 handover has not completed in step 511, the data transmission path (on which data are transmitted to the mobile terminal from the AR1 through the AP 3) is maintained (step 510) until the L3 handover is complete (step 511).

As described above, when handover is performed in the next generation mobile communication system having an overlapping area according to an embodiment of the present invention, L2 handover is performed when a mobile terminal moves between cells, and L3 handover is performed when a mobile terminal moves between cell groups. In contrast, the conventional technique, which allows simultaneous execution of the L2 handover and the L3 handover through the same signaling message, increases signaling message overhead, thereby increasing delay time. In addition, proper data transmission is not achieved until the L3 handover is completed, even after the L2 handover is completed in accordance with the execution of the L3 handover. In addition, the conventional technique requires a forwarding operation between routers for packets generated during the L3 handover. However, the present invention does not require the forwarding operation because it is possible to give access to access routers relating to the overlapping area in the overlapping area in which the L3 handover is performed.

As described above, according to the present invention, since L3 handover occurs in an overlapping area formed by overlapping cell groups, it is possible to reduce delay time due to L3 handover between cells.

In addition, since it is unnecessary to individually transmit packets to two routers when L3 handover occurs, it is possible to reduce a packet drop rate and packet delay time.

As described above, the method according to the present invention may be implemented by a computer program and stored on computer-readable recording media (CD-ROMs, RAMs, floppy disks, hard disks, magneto-optical disks, etc.).

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A handover method for an Internet protocol (IP)-based next generation mobile communication system, the handover method comprising the steps of:
    determining a border between a first cell group managed by a first access router and a second cell group managed by a second access router;
    arranging at the border an overlapping area in which each of the first access router and the second access router has access; and
    if a predetermined terminal enters the overlapping area, performing Layer 3 handover (L3 handover) between the access routers with respect to the mobile terminal, wherein the mobile terminal independently performs a Layer 2 handover (L2 hand over) based on the movement of the mobile terminal between cells after execution of the Layer 3 handover.

2. The handover method as claimed in claim 1, wherein, without a forwarding operation for packets generated during the Layer 3, the access routers have access to the mobile terminal and deliver the packets to the mobile terminal.

3. The handover method as claimed in claim 1, wherein, without a forwarding operation for packets generated during the Layer 3, the access routers have access to the mobile terminal and deliver the packets to the mobile terminal.

4. The handover method as claimed in claim 1, wherein, in the step of performing the Layer 3 handover, the mobile terminal detects a pilot signal and determines movement according to the pilot signal.

5. The handover method as claimed in claim 1, wherein, in the step of performing the Layer 3 handover, the mobile terminal detects a pilot signal and determines movement according to the pilot signal.

6. The handover method as claimed in claim 1, wherein, in the step of performing the Layer 3 handover, a base station of a cell including the mobile terminal detects movement of the mobile terminal.

7. The handover method as claimed in claim 1, wherein, in the step of performing the Layer 3 handover, a base station of a cell including the mobile terminal detects movement of the mobile terminal.

8. A handover method for an Internet protocol (IP)-based next generation mobile communication system arranging in borders between access routers managing cell groups an overlapping area to which all of the neighboring access routers have access, the handover method comprising the steps of:
   1) determining whether a predetermined mobile terminal goes into the overlapping area;
   2) starting a Layer 3 (L3) handover operation between the neighboring access routers as the mobile terminal goes into the overlapping area;
   3) if the Layer 3 handover operation between the neighboring access routers is completed, establishing a data path for the mobile terminal to pass through an access router after the Layer 3 handover;
   4) if the mobile terminal leaves a cell area including the mobile terminal in steps 2) and 3), performing Layer 2 handover in the mobile terminal between cells and data through a cell base station to the mobile terminal after the Layer 2 handover and through an access router to the mobile terminal before the Layer 3 handover; and
   5) if the mobile terminal leaves the cell area including the mobile terminal after step 3), performing the Layer 2 handover in the mobile terminal between cells and receiving data through the cell base station to the mobile terminal after the Layer 2 handover and through an access router to the mobile terminal after the Layer 3 handover.

9. The handover method as claimed in claim 8, wherein the mobile terminal has a path to both a cell base station before the Layer 2 handover and to an access router before the Layer 3 handover as a data path in steps 1) and 2).

10. The handover method as claimed in claim 9, wherein base stations of cells including the overlapping area have access to the overlapping access routers.

11. The handover method as claimed in claim 10, wherein base stations of cells including the overlapping area have access to the overlapping access routers.

12. The handover method as claimed in claim 9, wherein, without a forwarding operation for packets generated during the Layer 3 handover between the neighboring access routers, the neighboring access routers have access to the mobile terminal and deliver the packets to the mobile terminal.

13. The handover method as claimed in claim 9, wherein, in step 2), the mobile terminal detects a pilot signal and determines movement according to the pilot signal.

14. The handover method as claimed in claim 9, wherein, in step 2), a base station of a cell including the mobile terminal determines movement of the mobile terminal.

15. The handover method as claimed in claim 8, wherein, without a forwarding operation for packets generated during the Layer 3 handover between the neighboring access routers, the neighboring access routers have access to the mobile terminal and deliver the packets to the mobile terminal.

16. The handover method as claimed in claim 8, wherein, in step 2), the mobile terminal detects a pilot signal and determines movement according to the pilot signal.

17. The handover method as claimed in claim 8, wherein, in step 2), a base station of a cell including the mobile terminal determines movement of the mobile terminal.

18. A handover method for an Internet protocol (IP)-based next generation mobile communication system, the handover method comprising the steps of:
   arranging at borders between access routers managing cell groups, an overlapping area to which all of the neighboring access routers have access; and
   if a predetermined terminal enters the overlapping area, performing Layer 3 (L3) handover between the neighboring access routers with respect to the mobile terminal,
   wherein the mobile terminal independently performs Layer 2 (L2) handover according to movement between cells from execution of the L3 handover.

19. The handover method as claimed in claim 18, wherein, without a forwarding operation for packets generated during the L3 handover, the neighboring access routers have access to the mobile terminal and deliver the packets to the mobile terminal.

20. The handover method as claimed in claim 18, wherein, without a forwarding operation for packets generated during the L3 handover, the neighboring access routers have access to the mobile terminal and deliver the packets to the mobile terminal.

21. The handover method as claimed in claim 18, wherein, in the step of performing the L3 handover, the mobile terminal detects a pilot signal and determines movement according to the pilot signal.

22. The handover method as claimed in claim 18, wherein, in the step of performing the L3 handover, the mobile terminal detects a pilot signal and determines movement according to the pilot signal.

23. The handover method as claimed in claim 18, wherein, in the step of performing the L3 handover, a base station of a cell including the mobile terminal detects movement of the mobile terminal.

24. The handover method as claimed in claim 18, wherein, in the step of performing the L3 handover, a base station of a cell including the mobile terminal detects movement of the mobile terminal.

* * * * *